United States Patent [19]

Seager et al.

[11] 3,765,020

[45] Oct. 9, 1973

[54] DIGITALLY CONTROLLED ATTENUATOR

[75] Inventors: Ronald W. Seager, Hamilton; Dennis A. Lonigro, Woburn, both of Mass.; Oscar Lowenschuss, Goleta, Calif.

[73] Assignee: Raytheon Company, Lexington, Mass.

[22] Filed: Apr. 14, 1972

[21] Appl. No.: 243,963

[52] U.S. Cl. .......... 343/5 SM, 333/81 R

[51] Int. Cl. .......... G01s 7/34

[58] Field of Search .......... 343/5 R, 5 DP, 5 SM; 333/81 R

[56] References Cited

UNITED STATES PATENTS

| | | | |
|---|---|---|---|
| 3,305,859 | 2/1967 | Schwartz | 343/5 SM |
| 3,590,366 | 6/1971 | Vaughn | 333/81 R X |

*Primary Examiner*—T. H. Tubbesing
*Attorney*—Philip J. McFarland et al.

[57] ABSTRACT

A digitally controlled attenuator adapted for use with radio frequency signals is disclosed. The digitally controlled attenuator includes a radio frequency bus having connected thereto, at proper points therealong, a number of coupling and switching networks, each one thereof including a different attenuating shunt element of a ladder network. Each switching element, in turn, is responsive to a different digital control signal. The coupling and switching networks are connected to the radio frequency bus such that the signals passing through the shunt elements selected by any digital control signal are in proper relative phase relationship at various nodes of the ladder network. Unwanted radio frequency signals, leaking through a switching element which has been placed in its "off" condition, are cancelled by radio frequency signals having a relative 180° phase shift from the radio frequency signals being attenuated.

9 Claims, 7 Drawing Figures

DIGITALLY CONTROLLED ATTENUATOR

BACKGROUND OF THE INVENTION

This invention relates generally to digitally controlled attenuators and more particularly to digitally controlled attenuators adapted for use with radio frequency signals.

As is known in the art, it is sometimes desirable to adjust the gain of a radio frequency network in a desired manner, as for example the gain of the receiver of a search radar system. In such a system the power associated with the radio frequency echos from a target varies inversely with the fourth power of the range. Put another way, such power varies inversely with the fourth power of the propagation time of the radar energy. Many such search radar systems use a sensitivity time controller (STC) in the receiver thereof. Without an STC, a mixer or RF amplifier of the receiver would require an extremely wide dynamic range for processing signals having frequencies 1 MHZ to 120 MHZ. The STC reduces the dynamic range requirement of the mixer or amplifier by varying the gain (i.e. sensitivity) of the receiver as the fourth power of the propagation time of the radar energy, that is, in inverse relationship to the reduction in power associated with received echo signals from increasing ranges.

Known STC's generally use an analog attenuator, typically comprised of pin diodes, as discussed in Radar Handbook by M. I. Skolnik, McGraw-Hill Book Company, N.Y. 1970, pages 5–19 to 5–23. Such an analog attenuator is generally synchronized with each one of the transmitted pulses and the gain of such attenuator increases in accordance with the fourth power of the time interval after each one of such transmitted pulses. While such an analog attenuator has been found to be adequate in many applications, many inherent disadvantages, such as signal distortion, drift, and reliability exist therewith, which do not exist with a digitally controlled attenuator.

While a digitally controlled attenuator does not have the inherent disadvantages of the analog attenuator, known digital attenuators have not been able to operate satisfactorily with signal of radio frequency (that is of frequencies from 1–120 MHZ). For example, when field effect transistors (FET) are used in the digital attenuator, because of their relatively high switching speed (about 40 *n s*), radio frequency signals can couple through an "off" FET, because of its inherent interelectrode capacitance, and thereby prevent accurate control of the desired attenuation factor for the attenuator. Further, where a ladder network is used in the attenuator and portions of the radio frequency signals are coupled into selected shunt elements of the ladder network the relative phase shift between signals passing through different selected shunt elements may have significant effect on accurately establishing a desired attenuation factor for the attenuator.

SUMMARY OF THE INVENTION

With this background of the invention in mind it is an object of this invention to provide a digitally controlled attenuator adapted for use with radio frequency signals.

It is a further object of the invention to provide a digitally controlled attenuator adapted to adjust the gain of a ladder network wherein radio frequency signals are coupled through selected ones of a number of shunt elements of such network by means of high speed switching elements.

It is a further object of the invention to provide a sensitivity time controller for a radar receiver, such controller being operable at relatively high speeds, and adapted to respond to digital signals.

These and other objects of the invention are attained generally by providing means for coupling a first portion of the radio frequency signals to a compensator and a second portion thereof to a radio frequency (RF) bus. The RF bus has connected thereto, at predetermined points, a plurality of switching and coupling network, each one thereof used for coupling, in proper phase relationship, a part of the second portion of the radio frequency signals to a shunt element of a ladder network in accordance with a digital control signal. The output of the ladder network and the output of the compensator are combined in a manner such that any unwanted signals passing through the switching networks are effectively cancelled.

BRIEF DESCRIPTION OF THE DRAWINGS

The foregoing features of this invention, as well as the invention itself, may be more fully understood from the following detailed description read together with the accompanying drawings in which.

DESCRIPTION OF THE PREFERRED EMBODIMENTS

Figure 1:
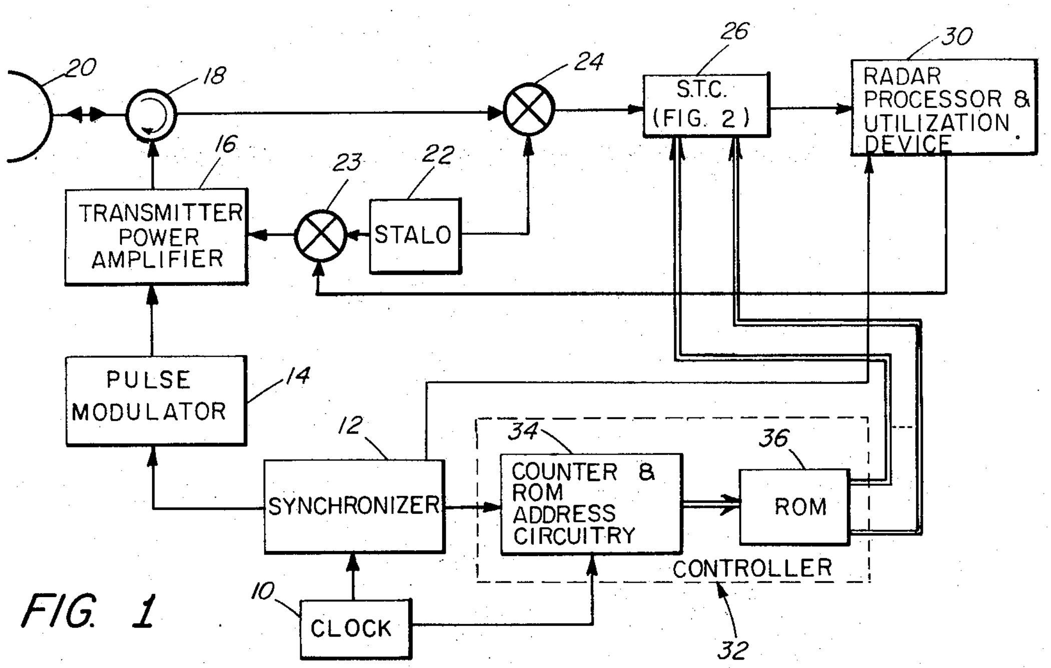
FIG. 1 is a block diagram of a search radar system using a digitally controlled attenuator according to the invention as a sensitivity time controller (STC)

Referring now to FIG. 1, a search radar system is shown to include a clock 10, synchronizer 12, pulse modulator 14, transmitter power amplifier 16, circulator 18 and antenna 20, all of conventional design and arranged as shown to transmit pulses of radio frequency energy in a conventional manner. Each one of transmitted pulses is initiated by a signal sent by sychronizer 12 to pulse modulator 14. The phase of each one of the transmitted pulses is established in a conventional manner by a signal produced by heterodyning the output of stable local oscillator (STALO) 22 with the output of coherent local oscillator (COHO) (not shown) in mixer 23. Therefore, the radar system here is coherent. Target returns associated with each one of the transmitted pulses at radio frequency are received by antenna 20 and, after passing through the circulator 18 and being heterodyned with the signal from STALO 22 in mixer 24, pass to STC 26. The details of STC 26 will be discussed later. Suffice it to say that the frequency of the signal passing to STC 26 is here about 120 MHZ. Radar processor and utilization device 30 include the coherent oscillator (COHO), not shown, (which produces a signal for mixer 23), a phase detector, processing apparatus and a display, all of conventional design and arrangement and synchronized in a conventional manner by signals supplied by synchronizer 12.

STC 26 may be considered as a variable gain (or attenuation) device operative to maintain the sensitivity of the receiver invariant over the propagation time of the return signal associated with each one of the transmitted pulses. The attenuation factor of STC 26 decreases as the fourth power of such propagation time of the radar energy by responding to digital signals produced by controller 32.

Controller 32 is responsive to signals from clock 10 and synchronizer 12. Controller 32 here includes a counter and read-only-memory (ROM) address circuitry 34 and a ROM 36. The counter portion of such circuitry 34 counts each clock pulse from clock 10 and for each one (or a desired number thereof) addresses a different word stored a priori in the ROM 36. The counter portion of circuitry 34 also counts the number of clock pulses and resets the addressing of the ROM 36 to initiate a new set when a new radar pulse is transmitted. It follows, then, that controller 32 here produces a different digital word during each one of a number of time intervals. Each one of such digital words, in turn, establishes, in a manner to be described, an attenuation factor for STC 26. The different digital words associated with each transmitted pulse establish, to a close approximation, the relationship between the desired decrease in attenuation factor of STC 26 and the fourth power of propagation time of the radar energy.

Figure 2:
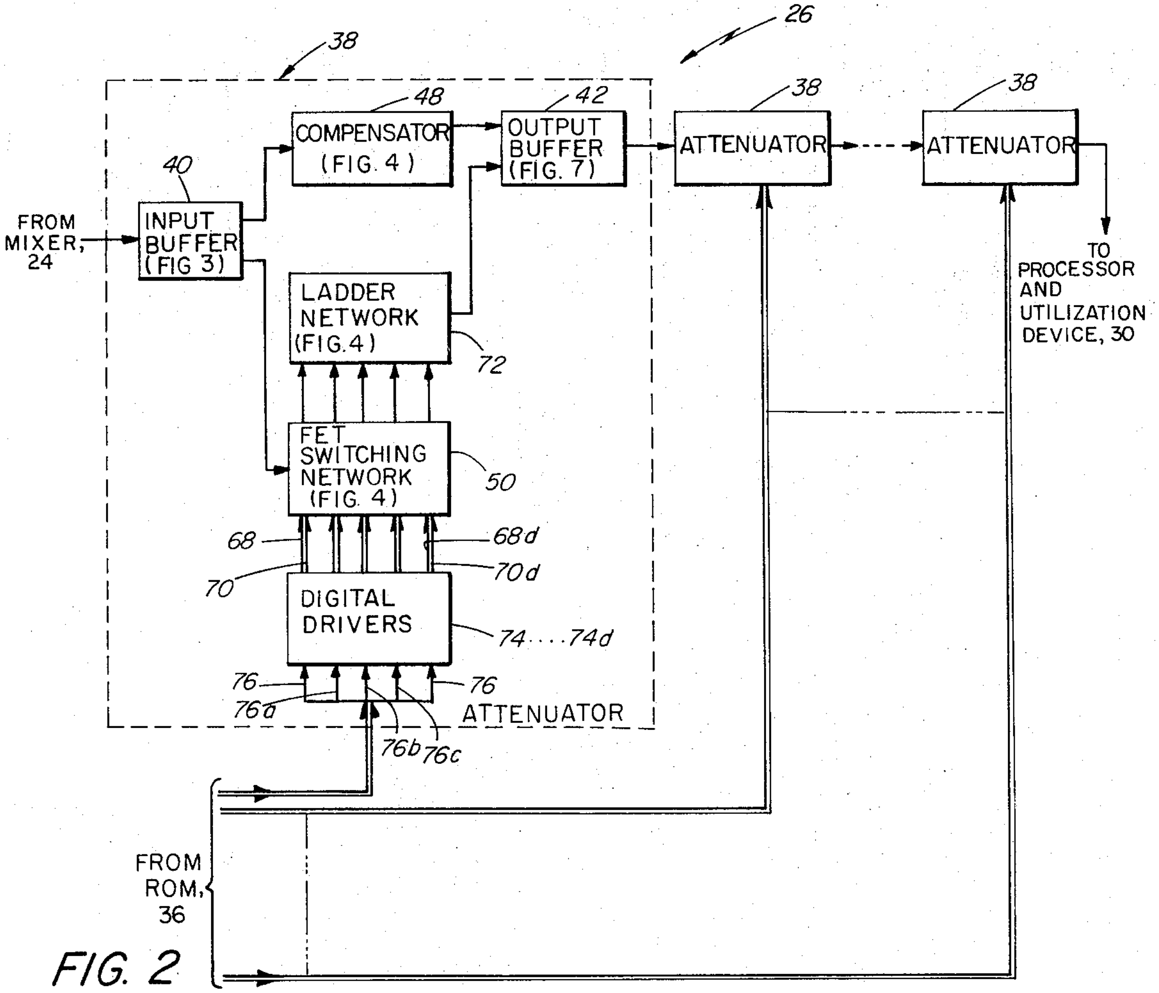
FIG. 2 is a block diagram of the STC shown in FIG. 1.
Figures 3, 6:
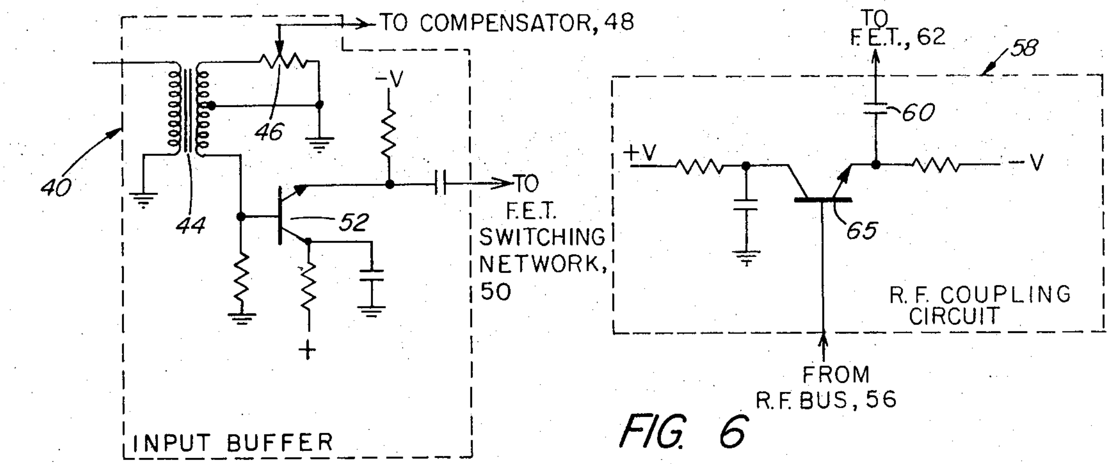
FIG. 3 is a schematic diagram of the input buffer used in the STC shown in FIG. 2.
FIG. 6 is a schematic diagram of an RF coupling circuit used in the FET switching network shown in FIG. 4.
Figure 7:
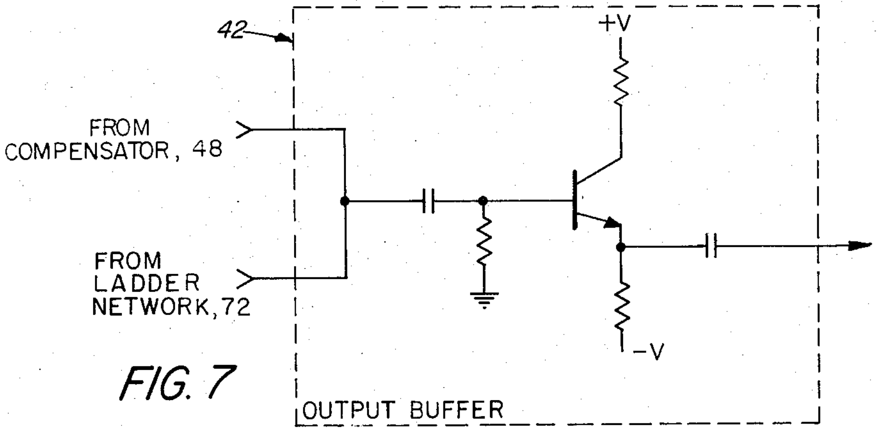
FIG. 7 is a schematic diagram of an output buffer used in the STC shown in FIG. 2.

Referring now to FIG. 2, STC 26 is shown to include a cascaded series of identical attenuators 38. The number of such attenuators 38 in any application is determined by the degree of approximation to the fourth power of propagation time of the radar energy desired. Each one of such attenuators 38 includes an input buffer 40 (FIG. 3). The input buffer 40 of the first attenuator of the series is connected to the output of mixer 24 (as shown in FIG. 1) and the input buffer of the remaining attenuators 38 is connected to the output buffer 42 (FIG. 7) of the preceding attenuator. (Only the output buffer 42 of the first attenuator is shown). The output buffer 42 of the last one of the series of attenuators 38 is connected to the radar processor and utilization device 30.

Referring to FIG. 3, it may be seen that RF signals applied to exemplary input buffer 40 are coupled, via transformer 44 and variable resistor 46, to a compensator 48 (FIG. 2) and also, via transformer 44 and transistor 52, to FET switching network 50 (FIG. 2).

Figure 4:
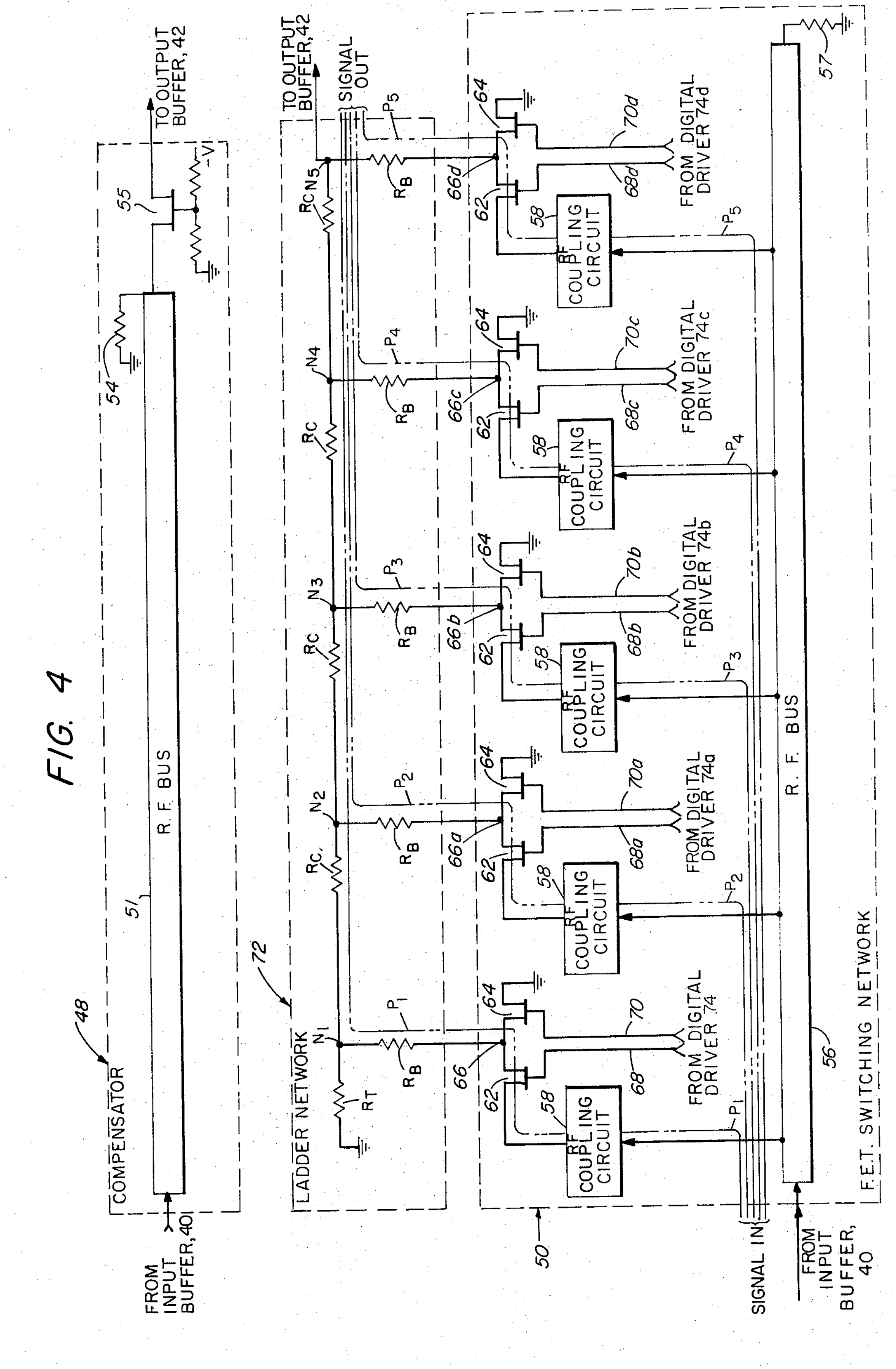
FIG. 4 is a schematic diagram of a ladder network, compensator, and FET switching network used in the STC shown in FIG. 2.

Compensator 48 and FET switching network 50 are included in each one of the attenuators, exemplary ones thereof being shown in detail in FIG. 4. Compensator 48 includes an RF bus 51, as a section of microstrip. RF bus 51 is terminated in a matching impedance 54 and feeds output buffer 42 (FIG. 2) through the inherent interelectrode capacitance between the source and drain electrodes of an "off" biased FET 55. FET switching network 50 includes an RF bus 56, here of microstrip. RF bus 56 is terminated in a matching impedance 57 and is used to couple a portion of the RF signals from input buffer 40 through selected ones of a number of pair of FET's 62, 64 in response to digital signals from ROM 36 (FIG. 1). Each one of the pair of FET's 62, 64 is connected to the RF bus 56 through a different one of a number of identical RF coupling circuits 58. The details of an exemplary one of the RF coupling circuits 58 are shown in FIG. 6 to include a transistor 65, the output of such transistor being connected to the drain electrode of one of the pair of FET's (here numbered 62 in FIG. 4) via capacitor 60. The transistor 65 is arranged, as shown, in each one of the RF coupling circuits 58 as an emitter follower, thereby providing a low impedance driving source and isolation from the remaining circuitry of the attenuator 38 (FIG. 2). This isolation reduces considerably adverse effects which are associated with loading changes as the attenuator 38 responds to changing digital signals from ROM 36 (FIG. 1).

Again referring to FIG. 4, the source electrode of each FET 62 is connected to the source electrode of a different one of each FET 64, thereby forming five pairs of FET's. The source electrodes of each pair of FET's 62, 64 are connected to a different one of five common terminals 66–66*d*. The drain electrode of each FET 64 is grounded. Each one of the pair of FET's 62, 64 is driven into an "on"-"off" or "off"-"on" state independently of any other pair of the FET's. The FET's in any pair of FET's are driven into mutually exclusive "on" and "off" conditions by responding to signals on lines 68, 70 – 68*d*, 70*d* in a manner to be discussed. Therefore, when, for example, one of the pair of FET's has FET 62 driven "on" (and therefore FET 64 of such pair driven "off") a portion of the RF signal from input buffer 40 (FIG. 2) passes along a portion of RF bus 56 through the one of the RF coupling circuits connected to such selected pair of FET's. Such RF signal then is impressed on a shunt element "$R_B$" of ladder network 72 connected to such pair of FEt's. Conversely, when one of the pair of FEt's has FET 62 driven "off" (and therefore FET 64 of such pair driven "on") the RF signal from input buffer 40 (FIG. 2) is substantially inhibited from passing to the shunt element $R_B$ connected to such selected pair of FET's. It is immediately apparent that because each one of the pairs of FET's are controlled independently, RF energy may be coupled or inhibited from passing to selected ones of the shunt elements $R_B$. Ladder network 72 also includes series elements "$R_C$" and a terminating resistor $R_T$ arranged as shown with respect to the shunt elements "$R_B$," thereby forming nodes $N_1$–$N_5$. The ladder network 72 is "balanced," meaning that: $R_T = R_B + R_{FET}$; $R_C = R_T/2$; and, $R_I = R_T$ where:

$R_{FET}$ = the resistance between the source and drain electrodes of an "on" FET; and $R_I$ = the input impedance of output buffer 42.

The RF coupling circuits 58 are connected at various points along RF bus 56 such that the phase shift of the RF signals are equal as each such RF signal passes along; (*a*) path $P_1$ to node $N_2$, and path $P_2$ to node $N_2$ respectively; (*b*) path $P_1$ to node $N_3$, path $P_2$ to node $N_3$ and path $P_3$ to node $N_3$ respectively; (*c*) path $P_1$ to node $N_4$, path $P_2$ to node $N_4$, path $P_3$ to node $N_4$, path $P_4$ to node $N_4$ resepctively; and (*d*) path $P_1$ to node $N_5$, path $P_2$ to $N_5$, path $P_3$ to node $N_5$, path $P_4$ to node $N_5$ and path $P_5$ to node $N_5$, respectively.

Figure 5:
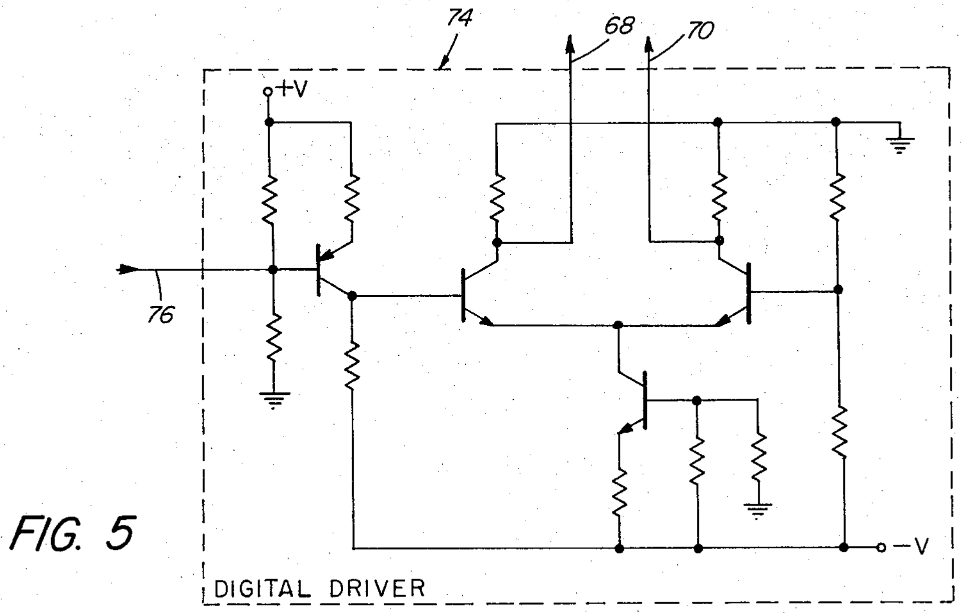
FIG. 5 is a schematic diagram of one of the drivers used in the STC shown in FIG. 2.

In operation, each one of the FET's in each pair of FET's 62, 64 is controlled by an independent one of an equal number of identical digital drivers 74 – 74*d* (FIG. 2), the details of an exemplary one thereof being shown in FIG. 5. Such digital drivers 74 – 74*d* are arranged for parallel operation and respond to the digital signals from ROM 36 (FIG. 1). The ROM 36 supplies an independent five bit digital word to each one of the attenuators 38, each such digital word having a most significant bit, MSB, and a least significant bit, LSB. Taking an exemplary one of the five bits of a digital word and referring to FIG. 5 it is seen that an exemplary digital driver 74 is basically a differential amplifier. That is, when the signal on line 76 is "high" (that is binary "*l*"), the signal on line 68 goes to zero volts, thereby turning FET 62 "on," and the signal on line 70 goes negative, thereby turning FET 64 "off," and when the signal on line 76 is " low" (that is binary "0") the signal on line 68 goes to zero volts thereby turning FET 62 "off" and the signal on line 70 goes negative thereby turning FET 64 "on." Therefore, referring to FIG. 4, and considering all five bits of the digital word, the pair of FET's connected to line 68*d*, 70*d* respond to the MSB of the digital signals and the pair of FET's to lines 68, 70 respond to the LSB of such signals. Consequently, for the five bit attenuator 38 here described, any one of 32 attenuation factors may be selected.

The function of compensator 48 is to cancel the effect of any RF signal which inherently couples through the FET 64 (i.e. passes along path $P_5$ when such FET 64 is "off." As is known, signals at radio frequency will couple through an FET even though such FET is "off" because of inherent interelectrode capacitance associated therewith. Referring to FIG. 3, it is seen that the portion of RF signals coupled to a compensator 48 is 180° out of phase with respect to the portion of the RF signal coupled to FET switching network 50 because of the arrangement of transformer 44. The setting of resistor 46 (FIG. 3) and the impedance of "off" FET 55 (FIG. 4) establishes the amplitude of the signal out of the compensator 48. Such amplitude is established to be equal to the amplitude of any signal passing through the FET 64 in path $P_5$ when such FET 64 is "off" because FET 55 of compensator 48 has inherently the same interelectrode capacitance. Because FET 55 and FET 64 are similar, the use of FET 55 automatically provides tracking of the amplitude and phase of the signals passing through path $P_5$ when FET 64 in path $P_5$ is "off." Because the signal out of compensator 48 and ladder network 72 are combined in output buffer 42, (the details being shown in FIG. 7), any RF signals passing through FET 64 along path P5 (when such FET 64 is "off") are cancelled. It should now be immediately apparent that a compensator similar to compensator 48 may be used for each other pair of the FET's associated with paths $P_1$–$P_4$ respectively.

Numerous variation in the described embodiments, within the scope of the appended claims, will now occur to those skilled in the art. For example, while the digital controlled attenuator has been described for use as a STC, such attenuator is adapted for use in many other applications, and particularly for use with radio frequency signals having frequencies from 1 MHZ to 200 MHZ. Further, the STC herein described may be operated such that the attenuator factor is changed in fixed increments during different time intervals. These variations are merely illustrative and hence it will be understood that the invention is not limited in scope to the particular embodiments herein shown, but only by the appended claims.

What is claimed is:

1. In a radar system wherein radio frequency signals produced by various objects in response to a series of pulses of radar energy are processed in the receiver of such system, such receiver including apparatus comprising:

a. means for producing digital signals indicative of the radio frequency signals as such signals are received;

b. attenuator means, responsive to the digital signals, for varying the attenuation of the radio frequency signals as such radio frequency signals pass through the attenuator means including means for compensating for variations in the phase of the radio frequency signals as such signals pass through the attenuator means.

2. The apparatus recited in claim 1 wherein the attenuator means comprises:

a. a radio frequency bus;

b. a ladder network having a plurality of shunt elements;

c. a plurality of switching means, responsive to the digital signals, each one of such switching means being connected between a different one of the shunt elements and a different point on such radio frequency bus, for coupling the radio frequency signals through selected ones of the shunt elements in accordance with the digital signals and for equalizing the phase of the radio frequency signals passing through the selected ones of the shunt elements.

3. The apparatus recited in claim 2 including additionally:

a. compensator means;

b. means for coupling a portion of the radio frequency signals to the radio frequency bus and another portion thereof to the compensator means;

c. means for combining the signals out of the compensator means with the signals out of the ladder network to cancel unwanted radio frequency signals coupling through an unselected one of the shunt elements.

4. In a radar system wherein radio frequency signals produced by various objects in response to each one of a series of pulses of radar energy are processed in the receiver of such system, a sensitivity time controller, for processing such radio frequency signals and for adjustingg the sensitivity of such receiver, comprising:

a. means, initiated in accordance with each one of the series of pulses for producing a set of digital signals, each one of the digital signals in such set having a value related to the desired sensitivity of the receiver; and b. attenuator means, responsive to each one of the digital signals for varying in accordance with the digital signals the attenuation of the radio frequency signals as such radio frequency signals pass therethrough including means for compensating for variations in the phase of the radio frequency signals as such signals pass through the attenuator means.

5. The sensitivity time controller recited in claim 4 wherein the attenuator means comprises:

a. a radio frequency bus;

b. a ladder network having a plurality of shunt elements;

c. a plurality of switching means, responsive to the digital signals, each one of such switching means being connected between a different one of the shunt elements and a different point on such radio frequency bus, for coupling the radio frequency signals through selected ones of such shunt elements in accordance with the digital signals and for equalizing the phase of the radio frequency signals passing through the selected ones of the shunt elements.

6. The sensitivity time controller recited in claim 5 including additionally:

a. compensator means;

b. means for coupling a portion of the radio frequency signals to the radio frequency bus and another portion thereof to the compensator means;

c. means for combining the signals out of the compensator means with the signals out of the ladder network to cancel unwanted radio frequency signals coupling through an unselected one of the shunt elements.

7. A digitally controlled attenuator responsive to digital signals and suitable for use with radio frequency signals comprising:

a. a radio frequency bus;

b. a ladder network having a plurality of shunt elements;

c. a plurality of switching means, responsive to the digital signals, each one of such switching means being connected between a different one of the shunt elements and a different point on such radio frequency bus, for coupling the radio frequency signals through selected ones of the shunt elements in accordance with the digital signals and for equalizing the phase of the radio frequency signals passing through the selected ones of the shunt elements.

8. The digitally controlled attenuator recited in claim 7 including additionally:

a. compensator means;

b. means for coupling a portion of the radio frequency signals to the radio frequency bus and another portion thereof to the compensator means;

c. means for combining the signals out of the compensator means with the signals out of the ladder network to cancel unwanted radio frequency signals coupling through an unselected one of the shunt elements.

9. The digitally controlled attenuator recited in claim 8 wherein each one of the plurality of switching means includes a pair of FET's and the compensator means is coupled to the combining means through an "off" biased FET.

* * * * *